United States Patent [19]
Ishibashi et al.

[11] Patent Number: 6,048,022
[45] Date of Patent: Apr. 11, 2000

[54] PANEL MADE OF SYNTHETIC RESIN FOR AUTOMOBILE

[75] Inventors: Masato Ishibashi; Toshiyuki Harada; Takashi Chirifu, all of Wako, Japan

[73] Assignee: Honda Giken Kogyo Kabushiki Kaisha, Tokyo, Japan

[21] Appl. No.: 08/957,158

[22] Filed: Oct. 24, 1997

[30] Foreign Application Priority Data

Oct. 25, 1996  [JP]  Japan .................................. 8-284189

[51] Int. Cl.$^7$ .................................................. B62D 25/10
[52] U.S. Cl. ........................... 296/188; 296/189; 296/191; 296/76; 296/901; 180/69.2
[58] Field of Search ............................. 296/189, 76, 901, 296/191, 188; 180/69.21, 69.2, 89.17

[56] References Cited

U.S. PATENT DOCUMENTS

| | | | |
|---|---|---|---|
| 4,662,115 | 5/1987 | Ohya et al. ............................... | 49/502 |
| 5,115,878 | 5/1992 | Hayata . | |
| 5,197,560 | 3/1993 | Oda et al. . | |

FOREIGN PATENT DOCUMENTS

| | | | |
|---|---|---|---|
| 0 363 744A2 | 4/1990 | European Pat. Off. . | |
| 2 238 676 | 2/1974 | Germany . | |
| 2034232 | 8/1979 | Germany ............................... | 296/189 |
| 124575 | 7/1985 | Japan ..................................... | 180/69.2 |
| 208174 | 8/1990 | Japan ..................................... | 180/69.21 |
| 54079 | 3/1991 | Japan ..................................... | 180/69.2 |
| 4-120015 | 10/1992 | Japan . | |
| 6-8309 | 1/1994 | Japan . | |

OTHER PUBLICATIONS

Patent Abstracts of Japan, vol. 018, No. 206 (M–1591), Apr. 12, 1994 & JP 06 008309 A.

Patent Abstracts of Japan, vol. 014, No. 254, (C–0724), May 31, 1990 & JP 02 073855A.

Patent Abstracts of Japan, vol. 014, No. 488 (M–1039), Oct. 24, 1990 & JP 02 198840A.

*Primary Examiner*—D. Glenn Dayoan
*Assistant Examiner*—Chad D. Wells
*Attorney, Agent, or Firm*—Nikaido Marmelstein Murray & Oram, LLP.

[57] ABSTRACT

A hood or trunk lid is a blow-molded article and includes an outer skin and a stiffener integral with the outer skin. The stiffener has a tub-like molded portion which extends in a widthwise direction of a vehicle body and protrudes toward the outer skin. A ridge of the tub-like molded portion is spaced apart from the outer skin, so that the hood or trunk lid is folded from a start point provided by the tub-like molded portion by a shock force from a collision.

15 Claims, 5 Drawing Sheets

PANEL MADE OF SYNTHETIC RESIN FOR AUTOMOBILE

BACKGROUND OF THE INVENTION

1. Field of the Invention

The present invention relates to a panel made of a synthetic resin for an automobile, and particularly, to a hood or trunk lid which is blow-molded and which includes an outer skin and a stiffener integral with the outer skin.

2. Description of the Prior Art

The present assignee has previously proposed a bonnet (hood) as such a type of a panel (see Japanese Utility Model Application Laid-open No. 4-120015 and Japanese Patent Application Laid-open No. 6-8309). Such a bonnet has a closed-sectional structure and hence, has a sufficient rigidity for practical use.

It is desirable for the bonnet to be formed so that when the automobile collides against another object, the bonnet folds or collapses by the shock force produced by the collision while overcoming its rigidity, and to absorb some of the shock force.

SUMMARY OF THE INVENTION

It is an object of the present invention to provide a panel made of a synthetic resin for an automobile, which is sufficiently rigid for practical use and which is formed so that it easily folds or collapses upon collision of the automobile.

To achieve the above object, according to the present invention, there is provided a panel used as a hood or a trunk lid made of a synthetic resin for an automobile, which is a blow-molded article and comprises an outer skin, and a stiffener integral with the outer skin, wherein the stiffener has a tub-like molded portion which extends in a widthwise direction of a vehicle body and protrudes toward the outer skin. A ridge of the tub-like molded portion is spaced apart from the outer skin, so that the panel is configured to be folded from a start point provided by the tub-like molded portion by a shock force from the front or rear of the vehicle body.

The panel has a closed-sectional structure, and therefore has a rigidity which is sufficient for practical use on an automobile body. On the other hand, when the automobile collides against another object, stress caused by the shock force is concentrated onto the tub-like molded portion of the stiffener, because the tub-like molded portion is spaced apart from the outer skin and is brittle. This causes the bonnet to be easily folded or collapsed into an angle shape from a start point provided by the tub-like molded portion.

BRIEF DESCRIPTION OF THE DRAWINGS

For a better understanding of the subject matter of the present invention, reference should be made to the accompanying drawings, wherein.

DETAILED DESCRIPTION OF THE PREFERRED EMBODIMENT

For convenience and clarity, the term "bonnet" will be used throughout this description. It should be understood, however, that the bonnet described in FIGS. 1–5 could be an automobile hood or trunk lid, or other panel of an automobile to which the inventive characteristics are appropriate.

Figure 1:
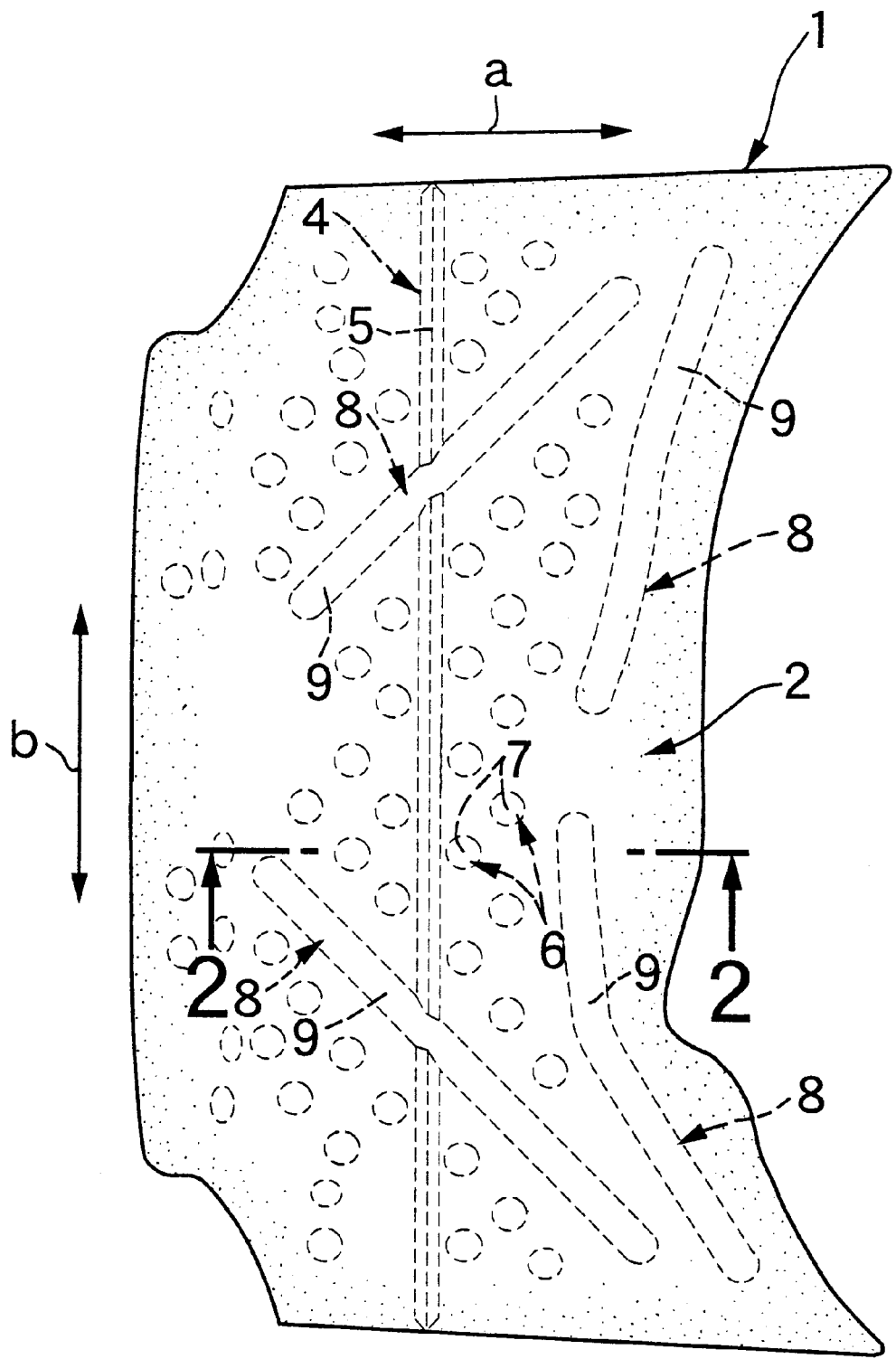
FIG. 1 is a plan view of a hood or bonnet according to an embodiment of the invention.
Figure 2:
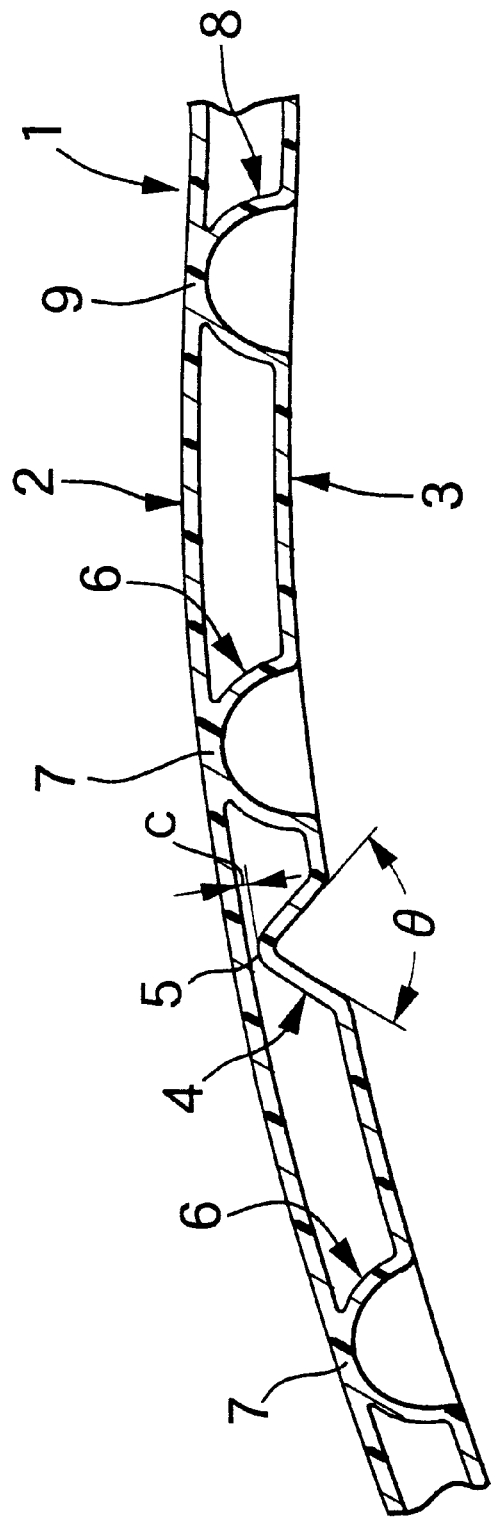
FIG. 2 is an enlarged sectional view taken along a line 2—2 in FIG. 1.
Figure 3:
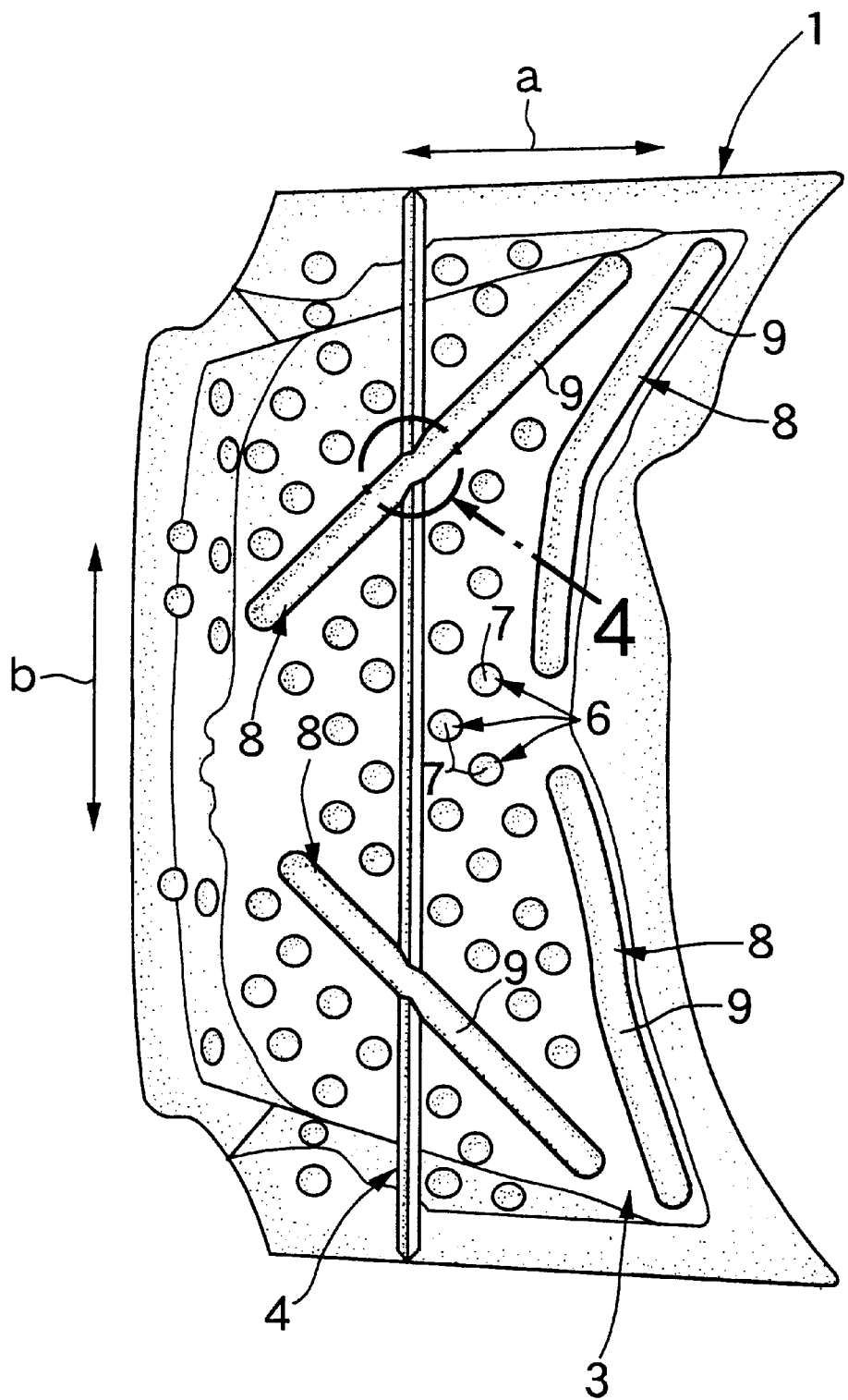
FIG. 3 is a back view of the hood or bonnet shown in FIG. 1.

In FIGS. 1 to 3, a bonnet 1 is a blow-molded panel for an automobile, made of a synthetic resin. The panel includes outer skin 2, and stiffener 3 integral with the outer skin 2, and has a closed-sectional structure. Each of outer skin 2 and stiffener 3 are formed from a synthetic resin selected from, for example, nylon-based polymer alloy, ABS, polyethylene, polypropylene, or other suitable material.

Stiffener 3 is molded with a tub-like molded portion 4 which is angle-shaped in section, which extends over the substantially entire length in a widthwise direction b of a vehicle body at a central portion of the stiffener 3 in a longitudinal direction a of the vehicle body, and which extends from an inner surface of stiffener 3 toward outer skin 2. The tub-like molded portion 4 has an inner edge or ridge 5 which is spaced at a distance c apart from the outer skin 2.

The stiffener 3 has a large number of semi-spherical shell-like reinforcing lugs 6 which are disposed over the substantially entire area of the stiffener 3 and protrude toward the outer skin 2, and a top 7 of each of the lugs 6 is fused to the outer skin 2. In this case, each of the reinforcing lugs 6 and the tub-like molded portion 4 do not intersect each other, thereby ensuring a rigidity enhancing effect provided by each reinforcing lug 6.

Figure 4:
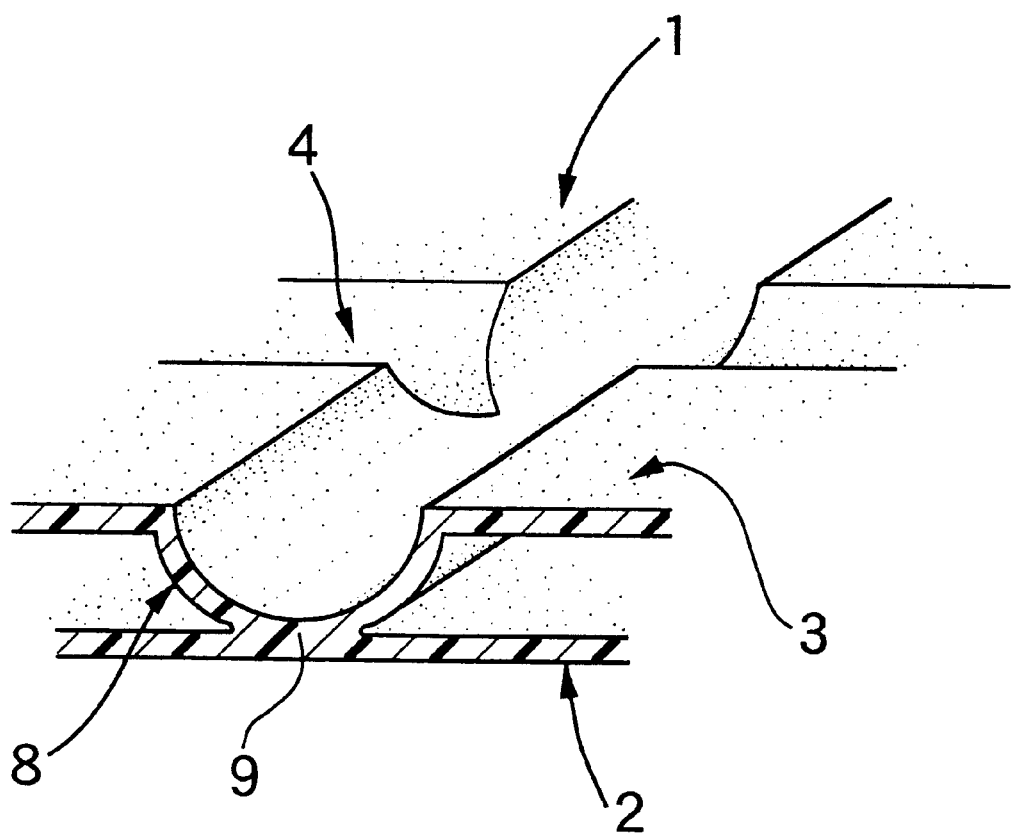
FIG. 4 is an enlarged perspective view of a portion indicated by arrow 4 in FIG. 3.

The stiffener 3 also has four reinforcing ribs 8 which are semicircular in cross section and which protrude toward the outer skin 2. A ridge 9 of each of the reinforcing ribs 8 is fused to the inner surface of the outer skin 2. The two reinforcing ribs 8 extend in the widthwise direction b of the vehicle body at a rear edge of the stiffener 3, and the two other reinforcing ribs 8 extend from near ends of the two first reinforcing ribs 8 in the widthwise direction b of the vehicle body to intersect the tub-like molded portion 4, as shown in FIGS. 1, 3 and 4. The fusing of each reinforcing lug 6 as well as each reinforcing rib 8 and the outer skin 2 is performed when the bonnet is molded.

The bonnet 1 has a sufficient rigidity for practical use, because it has the closed-sectional structure and includes the plurality of reinforcing lugs 6 and the reinforcing ribs 8.

Figure 5:
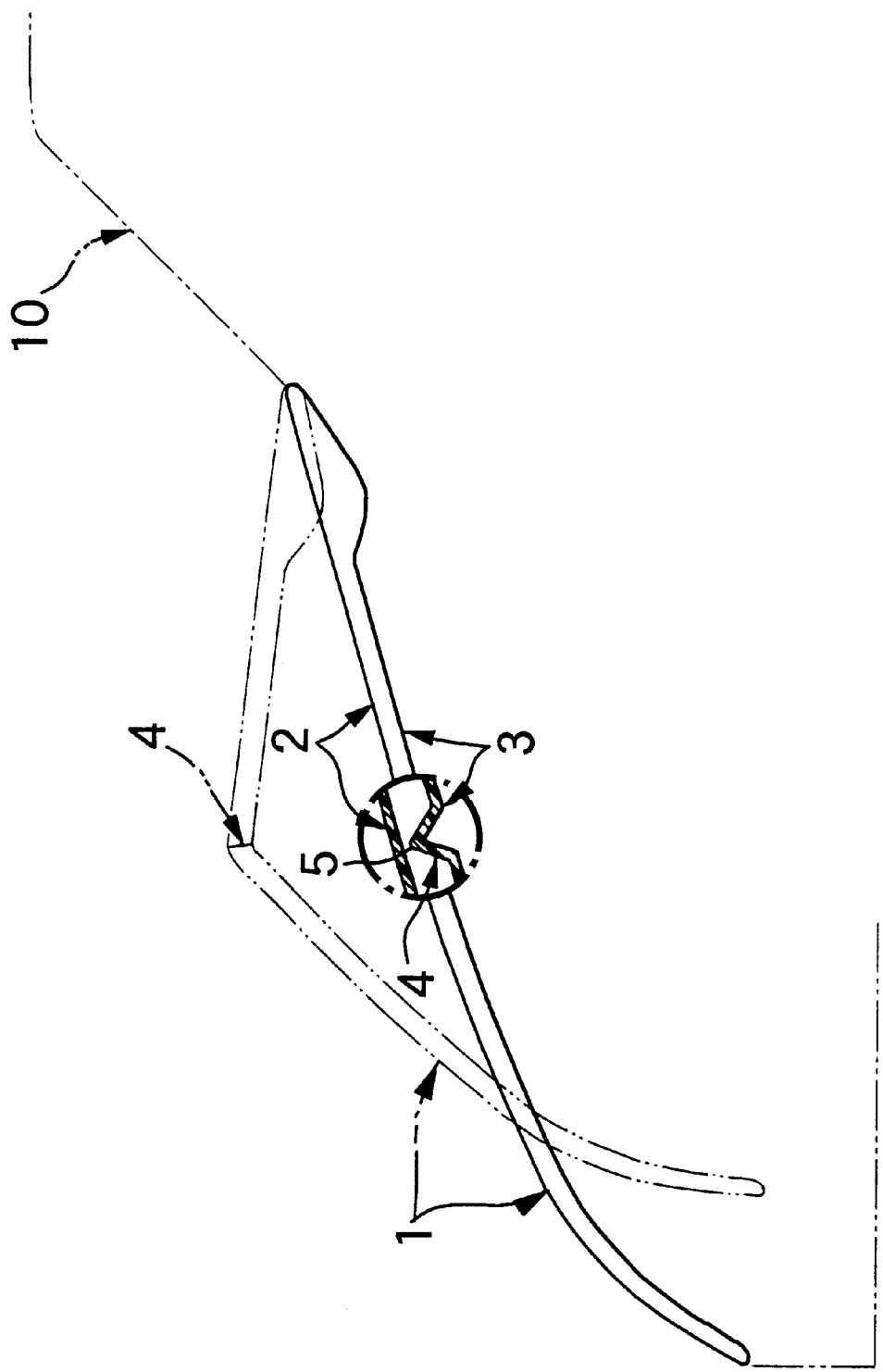
FIG. 5 is an illustration for explaining the folding or collapsing of the bonnet.

When the automobile 10 collides against another object in a state shown by a solid line in FIG. 5, stress caused by the shock force of the impact is concentrated onto the tub-like molded portion 4, because the tub-like molded portion 4 of the stiffener 3 is spaced apart from the outer skin 2, and is brittle. The tub-like molded portion 4 therefore functions as a "weak spot", and therefore acts as a point of collapse of the bonnet. This configuration causes the bonnet 1 to be easily folded into an angle shape from a start point provided by the tub-like molded portion 4, as shown by a dashed line in FIG. 5. Thus, the shock force produced by the collision can be absorbed. To permit the bonnet 1 to be reliably folded or collapsed in this manner, it is also desirable that the vertical angle of the tub-like portion 4 is in a range of $\leq 90°$.

According to the present invention, it is possible to provide a panel made of a synthetic resin for an automobile which is used as a bonnet or a trunk lid and has a rigidity sufficient for practical use and which is capable of absorbing a shock force upon frontal collision or rear-end collision of the automobile by constructing the panel in the above-described manner.

We claim:

1. A body panel for an automobile, said body panel being formed by blow-molding and comprising:
   an outer skin;
   a stiffener panel integral with said outer skin;
   a tub-like portion integral with said stiffener and extending in a widthwise direction of a vehicle body, said tub-like portion having an inner surface which extends from an inner surface of said stiffener toward an inner surface of said outer skin, with an innermost edge of the tub-like portion being separated from said inner surface of said outer skin by a gap;
   a pair of reinforcing ribs extending at angles with respect to a longitudinal direction of said vehicle body such that the reinforcing ribs are distanced larger from each other at one end thereof than at the other end, said reinforcing ribs intersecting said tub-like portion and each having a semicircular cross section and protruding toward the inner surface of the outer skin, with a ridge of each of said reinforcing ribs being fused to said inner surface of the outer skin; and
   at least one further reinforcing rib of a semicircular cross section extending so as to avoid intersecting said tub-like portion,
   wherein said outer skin and said stiffener are configured to be folded along said tub-like portion based upon a shock force on the body panel.

2. A body panel as recited in claim 1, further comprising a plurality of reinforcing lugs integrally formed on said stiffener, said lugs extending from said inner surface of said stiffener toward said inner surface of said outer skin, with an inner surface of each of said reinforcing lugs being fused to said inner surface of said outer skin.

3. A body panel as recited in claim 1, wherein said panel comprises a trunk lid, and wherein said outer skin and said stiffener are configured to collapse along said tub-like portion based upon a shock force from a rear of the automobile.

4. A body panel as recited in claim 1, wherein said panel comprises an automobile hood, and wherein said outer skin and said stiffener are configured to collapse along said tub-like portion based upon a shock force from a front of the automobile.

5. A body panel as recited in claim 1, wherein an air gap is disposed between the inner surface of the outer skin and the inner surface of the stiffener.

6. A body panel as recited in claim 1, wherein said tub-like portion comprises a first surface and a second surface extending toward said inner surface of said outer skin, said first surface and said second surface forming an angle therebetween.

7. A body panel as recited in claim 6, wherein said angle is not greater than 90 degrees.

8. A body panel as recited in claim 1, wherein said tub-like portion is disposed in a longitudinally central portion of the outer skin, and which laterally extends along a substantially entire width of the outer skin.

9. A body panel as recited in claim 1, wherein said outer skin, said stiffener, and said tub-like portion comprises a nylon-based polymer alloy.

10. A body panel as recited in claim 1, wherein said outer skin, said stiffener, and said tub-like portion comprises an ABS plastic.

11. A body panel as recited in claim 1, wherein said outer skin, said stiffener, and said tub-like portion comprises polyethylene.

12. A body panel as recited in claim 1, wherein said outer skin, said stiffener, and said tub-like portion comprises polypropylene.

13. A body panel as recited in claim 1, wherein said at least one further reinforceing rib is a pair of further reinforcing ribs are provided so as to extend in an aligned manner substantially along the widthwise direction of the vehicle body with a spacing therebetween.

14. A body panel as recited in claim 1, wherein said at least one further reinforcing rib is formed at a position on said body panel that is between said pair of reinforcing ribs and a compartment of said automobile.

15. A body panel as recited in claim 13, wherein said pair of further reinforcing ribs are formed at positions on said body panel that are between said pair of reinforcing ribs and a compartment of said automobile.

* * * * *